United States Patent
Pike et al.

(10) Patent No.: US 8,271,461 B2
(45) Date of Patent: Sep. 18, 2012

(54) STORING AND MANAGING INFORMATION ARTIFACTS COLLECTED BY INFORMATION ANALYSTS USING A COMPUTING DEVICE

(75) Inventors: William A. Pike, Richland, WA (US); Roderick M. Riensche, West Richland, WA (US); Daniel M. Best, Pasco, WA (US); Ian E. Roberts, Kennewick, WA (US); Marie V. Whyatt, West Richland, WA (US); Michelle L. Hart, Richland, WA (US); Norman J. Carr, Pasco, WA (US); James J. Thomas, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 376 days.

(21) Appl. No.: 12/688,983

(22) Filed: Jan. 18, 2010

(65) Prior Publication Data

US 2011/0179093 A1   Jul. 21, 2011

(51) Int. Cl.
*G06F 17/30* (2006.01)
(52) U.S. Cl. .................................................... 707/695
(58) Field of Classification Search .................. 707/695
See application file for complete search history.

(56) References Cited

U.S. PATENT DOCUMENTS

| | | | |
|---|---|---|---|
| 5,491,511 A * | 2/1996 | Odle | 348/153 |
| 5,768,565 A * | 6/1998 | Matsuda et al. | 703/6 |
| 6,574,675 B1 * | 6/2003 | Swenson | 719/316 |
| 6,690,392 B1 * | 2/2004 | Wugoski | 715/744 |
| 6,983,328 B2 * | 1/2006 | Beged-Dov et al. | 709/230 |
| 7,203,663 B1 * | 4/2007 | Buisman et al. | 705/38 |
| 7,239,316 B1 * | 7/2007 | Cox et al. | 345/440 |
| 7,275,240 B2 * | 9/2007 | Cole et al. | 717/137 |
| 7,421,654 B2 * | 9/2008 | Wugoski | 715/704 |
| 7,571,431 B2 * | 8/2009 | Hampapuram et al. | 717/141 |
| 7,870,493 B2 * | 1/2011 | Pall et al. | 715/751 |
| 7,987,446 B2 * | 7/2011 | Cypher et al. | 717/106 |
| 8,019,579 B1 * | 9/2011 | Wey et al. | 703/6 |

(Continued)

OTHER PUBLICATIONS

William A. Pike. 2005. Augmenting Collaboration Through Situated Representations of Scientific Knowledge. Ph.D. Dissertation. Pennsylvania State University, University Park, PA, USA. Advisor(s) Mark N. Gahegan. Available online at https://etda.libraries.psu.edu/paper/6585/1838.*

(Continued)

*Primary Examiner* — Mark Andrew X Radtke
(74) *Attorney, Agent, or Firm* — A J Gokcek; A C Tuan

(57) ABSTRACT

Systems and computer-implemented processes for storage and management of information artifacts collected by information analysts using a computing device. The processes and systems can capture a sequence of interactive operation elements that are performed by the information analyst, who is collecting an information artifact from at least one of the plurality of software applications. The information artifact can then be stored together with the interactive operation elements as a snippet on a memory device, which is operably connected to the processor. The snippet comprises a view from an analysis application, data contained in the view, and the sequence of interactive operation elements stored as a provenance representation comprising operation element class, timestamp, and data object attributes for each interactive operation element in the sequence.

12 Claims, 3 Drawing Sheets

U.S. PATENT DOCUMENTS

| | | | |
|---|---|---|---|
| 8,020,112 B2* | 9/2011 | Ozzie et al. | 715/770 |
| 8,028,241 B2* | 9/2011 | Kodosky et al. | 715/763 |
| 8,055,104 B2* | 11/2011 | Dawson et al. | 382/321 |
| 8,104,017 B2* | 1/2012 | Lin et al. | 717/107 |
| 8,108,829 B2* | 1/2012 | Cypher et al. | 717/106 |
| 2002/0049961 A1* | 4/2002 | Fang et al. | 717/127 |
| 2003/0014379 A1* | 1/2003 | Saias et al. | 706/45 |
| 2003/0158856 A1* | 8/2003 | Nishigaya et al. | 707/102 |
| 2006/0064674 A1* | 3/2006 | Olson et al. | 717/113 |
| 2006/0066509 A1* | 3/2006 | Gross | 345/8 |
| 2006/0161886 A1* | 7/2006 | Ge | 717/106 |
| 2008/0027782 A1 | 1/2008 | Freire et al. | |
| 2008/0034298 A1* | 2/2008 | Kodosky et al. | 715/763 |
| 2008/0040181 A1 | 2/2008 | Freire et al. | |
| 2008/0092109 A1* | 4/2008 | Kinnucan et al. | 717/105 |
| 2008/0097816 A1 | 4/2008 | Freire et al. | |
| 2008/0098349 A1* | 4/2008 | Lin et al. | 717/106 |
| 2008/0148155 A1* | 6/2008 | Kogan et al. | 715/736 |
| 2010/0299347 A1* | 11/2010 | Greenberg et al. | 707/769 |

OTHER PUBLICATIONS

William Pike et al. 2003. Supporting Collaborative Science through a Knowledge and Data Management Portal. ISWC 2003 Workshop Semantic Web Technologies for Searching and Retrieving Scientific Data. Available online at http://citeseerx.ist.psu.edu/viewdoc/summary?doi=10.1.1.63.2940.*

George Chin, Jr. and Carina S. Lansing. 2004. Capturing and supporting contexts for scientific data sharing via the biological sciences collaboratory. In Proceedings of the 2004 ACM conference on Computer supported cooperative work (CSCW '04). ACM, New York, NY, USA, 409-418. DOI=10.1145/1031607.1031677 http://doi.acm.org/10.1145/1031607.1031677.*

Moreau, L., et al.; "Managing Rapidly-Evolving Scientific Workflows", LNCS, 2006, 10-18 pps., Springer-Verlag, Berlin, Heidelberg.

* cited by examiner

```
<Snippet>
    <Header>
        <SnippetID>869</SnippetID>
        <MimeType>text/plain</MimeType>
        <UserID>xyz123</UserID>
        <ApplicationName>Firefox</ApplicationName>
        <SourceID>http://www.cnn.com/</SourceID>
        <CapturedDatetime>6/22/2009 2:39:58 PM</CapturedDatetime>
        <UserComment/>
    </Header>

<View>
        <TextFragment> A defiant and chaotic protest sprouted in and around a public square Monday despite a warning by Iran's Revolutionary Guard against the kind of street demonstrations that have roiled Iran for more than a week.</TextFragment>
    </View>

<Provenance>
        <Select timestamp="6/22/2009 2:39:50">
            <Object> A defiant and chaotic protest sprouted in and around a public square Monday despite a warning by Iran's Revolutionary Guard against the kind of street demonstrations that have roiled Iran for more than a week.</Object>
        </Select>
        <Select timestamp="6/22/2009 2:37:19">
            <Object>http://www.cnn.com/2009/WORLD/meast/06/21/iran.election/index.html</Object>
        </Select>
        <Pan timestamp="6/22/2009 2:37:18">
            <Object>225px</Object>
        </Pan>
        <Select timestamp="6/22/2009 2:37:12">
            <Object>http://www.cnn.com</Object>
        </Select>
    </Provenance>
</Snippet>
```

*Fig. 2*

STORING AND MANAGING INFORMATION ARTIFACTS COLLECTED BY INFORMATION ANALYSTS USING A COMPUTING DEVICE

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Workers in a number of fields often must create reports to summarize and document their work. Information analysts, in particular, often use a variety of tools, but rarely do these tools support the reporting process, and if they do, they do so individually. Among current information collection and/or management tools, there is a lack of an "analytic umbrella" that can tie together the variety of tools that an individual, such as an information analyst, uses. Moreover, whenever the analyst collects a piece of information or an information artifact, typically, he wants to capture at least some metadata about that piece of information. Exemplary metadata might describe the source, purpose, etc., of the information artifact. Finally, using traditional tools, generated reports are typically static and cannot be altered and/or updated as information changes or as new information becomes available. The ability for information analysts to indicate the relationships among the collected information, the analyses performed, and the statements made in reports, particularly in dynamic reports, can significantly improve the quality of the analyses and the effectiveness of information dissemination. Accordingly, a need exists for new systems and computer-implemented processes for storing and managing information artifacts collected by information analysts.

SUMMARY

The present invention can help analysts track the progress of their work, and can make it convenient for others to evaluate, understand, or reuse the work because the reports that emerge are "active" in that they have references to the data and to the analytic provenance that underlie them. This can allow the reports to be automatically updated as the data and/or the analytic provenance changes and develops. Analytic provenance can refer to the sequence of steps the analyst took to arrive at a finding. This provenance includes not just a reference to the source from which data might have come, but the series of interactions the analyst had with a variety of software applications and/or cognitive processes that resulted in a given element of knowledge arising from that data.

Embodiments of the present invention include systems and computer-implemented processes for storing and managing information artifacts collected by information analysts using a computing device. As used herein, information artifacts can refer to content such as text, image, audio and/or video represented in a computer system. An artifact can also include an "analysis session," which is a digital representation of the state, or sequence of states, of a particular analysis application. For example, an information artifact can comprise the "view" an analyst created in a data visualization tool together with the data contained in that view and the series of operations performed by the analyst to arrive at that view.

The processes, and the systems programmed to execute them, map specific, available interactive affordances of a plurality of software applications to general interactive operation elements in a computer-readable provenance representation. Interactive affordances, as used herein, can refer to the actions a user can take by manipulating the specific controls provided by a software application. Interactive operation elements can refer to a generalized set of ways in which a user can interact with an analysis application, independent of their instantiation in a particular interactive control within a particular software application. Thus, interactive affordances can refer to the interactive actions that are possible using a particular software application. Various software applications can have different interactive affordances. Exemplary interactive affordances can include, but are not limited to dragging, following a link, typing text, or highlighting a screen region.

While interactive affordances comprise the specific controls that a software application provides, interactive operation elements comprise general events such as pan, zoom, select, add data, and remove data. Interactive operation elements are general classes of interaction that are available across applications. Accordingly, in one example, the application-specific interactive affordance of dragging a map scale slider can be mapped to a general interactive operation element "zoom". In another example, the interactive affordance of following a URL link on a web page can be mapped to an interactive operation element "select". In a third example, the interactive affordance of typing text into a web search query field would be mapped to the interactive operation element "add data". Mapping affordances of a plurality of software applications to a common interactive operation schema enables a single computational language to represent the interaction a user has with any software tool.

Embodiments of the present invention can capture a sequence of interactive operation elements that are performed by the information analyst, who is collecting an information artifact from at least one of the plurality of software applications. The aspect of the present invention by which the analyst captures information artifacts is referred to herein as a snippet collector. The information artifact can then be stored together with the interactive operation elements as a snippet on a memory device, which is operably connected to the processor. The information artifact is stored in the snippet as a view that represents the outward appearance of the snippet (such as a block of text or an image of a software application in a particular state) and the sequence of interactive operation elements is stored as a provenance representation comprising operation element class (pan, zoom, select, etc.), timestamp, and data object attributes for each interactive operation element in the sequence. The data object attributes reflect application-specific information related to the interaction element. For instance, in the case of a user clicking a link on a web page (which may be mapped to a "select" event), the data object for that interactive operation element is the URL to which the user navigated as a result). In the case of a user clicking on a node in a graph visualization which results in an expansion of the node to a collection of subnodes (which may be mapped to a "zoom" event), the data object would contain the internal identifier for the clicked node in the subject application.

In some embodiments, a plurality of snippets can be arranged into a report. Preferably, a reference is created between snippets arranged in the report and those stored on the memory device. This reference consists of an internal identifier for the snippet, represented in one or both of a machine-readable and human-readable form, connected to a passage in the report. The reference indicates from which snippet or snippets the content in a report passage is derived, and these references may further be typed to indicate the nature of the relationship between the snippet and passage (such as the snippet serving as "supporting evidence" for the passage). The reference is not simply a citation, but a direct semantic link between a passage in the report and the analytic provenance, as expressed in a snippet, that underlies that passage.

In preferred embodiments, the memory device comprises a centralized repository that has a communications interface providing access for a plurality of information analysts. In such instances, snippets can be captured from a plurality of information analysts and stored on the centralized repository, which can provide snippets from a first information analyst to a second information analyst. Furthermore, embodiments of the present invention can be configured to automatically serve particular snippet feeds through the communications interface to one or more subscribed information analysts.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 2 is an extensible markup language (XML) representation of a snippet according to embodiments of the present invention.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Figure 1:
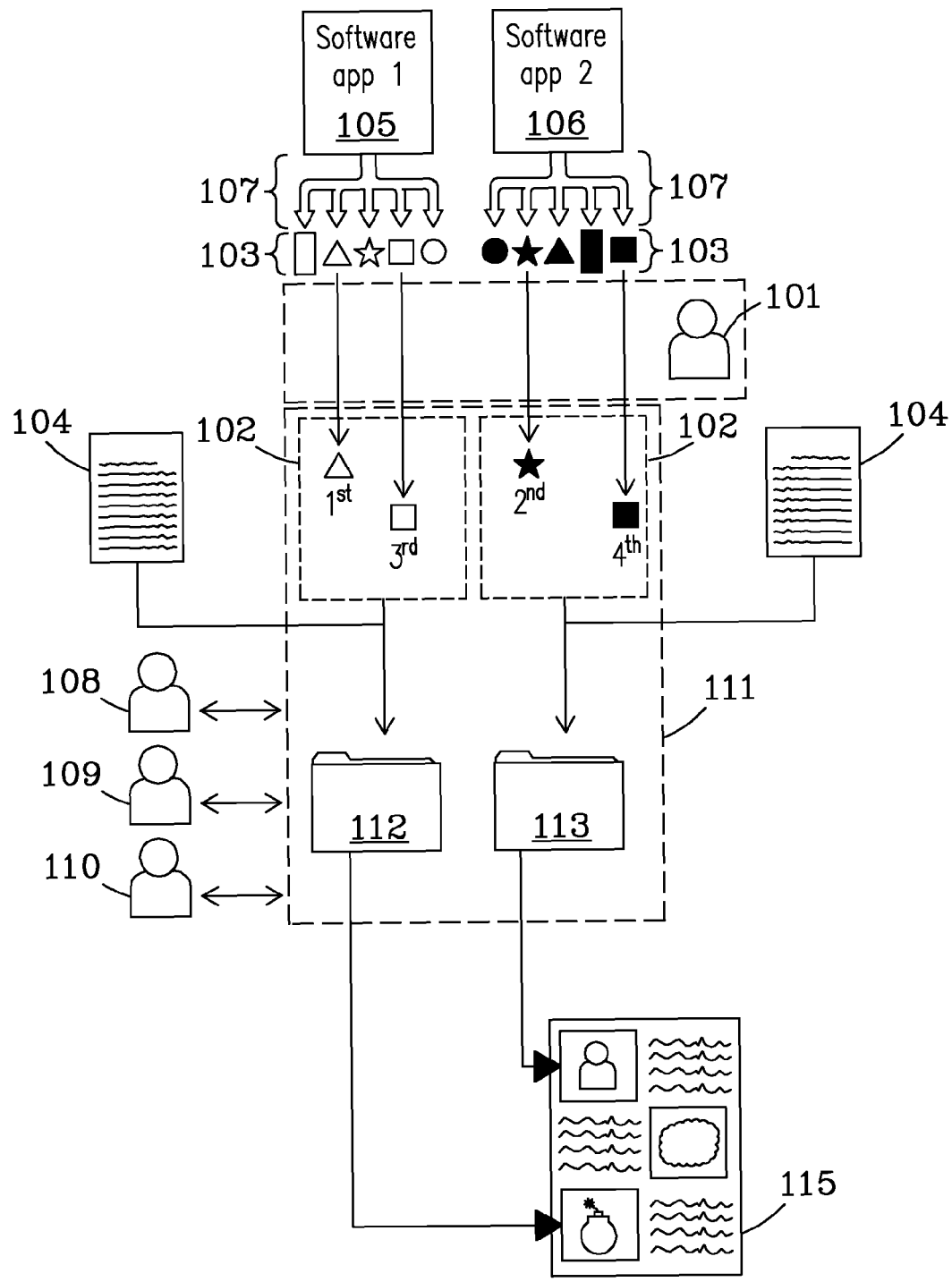
FIG. 1 is an illustration depicting embodiments of the present invention for storing and managing information artifacts.

Referring to FIG. 1, an illustration depicting one embodiment of the present invention is shown. Activities performed by analyst 101 using the interactive affordances 107 of two different software applications 105, 106 to collect information are captured and stored along with the resultant information artifacts 104. The data collection activities that correspond to interactive operation elements 103 are stored in a provenance representations 102 in the sequence in which they were performed by the analyst. An embodiment of the present invention monitors the interaction between the analyst and the plurality of analysis software. The snippet collector 111 provides an analytic umbrella by performing introspection into each available analysis tool. The snippet collector may be configured to monitor the behavior of one or more other software applications (referred to here as analysis tools) on the user's computer. The snippet collector then automatically creates snippets 112, 113 when certain application events occur in these tools. The application events that should trigger the creation of a new snippet may be specified a priori via configuration information for each monitored application. This configuration information contains a list of the application events observable by the snippet collector that should cause a new snippet to be created, containing the data objects referenced by that event. Moreover, the snippet collector can record the sequence 102 of interactive operation elements that preceded that event as the provenance information for this snippet. The interactive operation element recording can be accomplished by continuously tracking the interactions between the user and the interactive affordances 107 of an analysis application, but only recording this history, up to a user-specifiable number of prior steps, in a snippet when an application event occurs that triggers the creation of a snippet. The snippet collector then creates a new snippet corresponding to this interactive operation element when it observes this application event. In another embodiment, the snippet collector may be configured to monitor a directory or file for changes, and use these changes as the basis for a new snippet (for instance, an analysis application may output data to a log file, which the snippet collector monitors and interprets; entries in this log file may be converted to snippets or may provide information that allows the snippet collector to retrieve the content for a new snippet elsewhere). The application event triggered by an interactive control that the user manipulates is captured by the snippet collector as an operation element of the provenance representation. For each information analysis application from which the snippet collector receives snippets, the interactive components of that information analysis application, which may include both control components such as buttons and sliders as well as directly manipulatable visual features such as components of an information visualization, are mapped a priori to an entry in a taxonomy of potential interaction tasks. These tasks, or interactive operation elements, are defined elsewhere herein and, in essence, are events held in common across software applications (pan, zoom, select, etc.). The mapping may be done through an internal representation maintained in the memory of the snippet collector that contains entries for application events in analysis applications and the corresponding interaction elements in the taxonomy of interactive operation elements. The mapping is created by identifying those analysis application events (i.e., actual interactive affordances) that can be detected by the operating system on which the snippet collector application is running, or which can otherwise be broadcast to the snippet collector via the source application's own application programming interface, and determining to which of the abstract interaction elements that particular analysis application event corresponds.

In the current embodiment, this mapping is determined by the user or by a software developer prior to the snippet collector being able to collect provenance information from a source application. An analysis session begins when a user launches an analysis software application. The snippet collector may detect this application launch event and begin monitoring for application events to record. For each interaction event that has a corresponding entry in the snippet collector's internally maintained taxonomy, the snippet collector records a timestamp, the type of interaction event (pan, select, zoom, etc.), and metadata including the name of the source application, a reference in the source application's own representation to the data object with which the user interacted, and the identity of the analyst user. When the analyst requests that a snippet be captured based on a view currently displayed on one of the plurality of analysis applications, the snippet collector writes the provenance sequence to persistent storage which may be local or remote to the computer system on which the snippet collector is running.

The information artifact and its provenance representation that was collected by the analyst performing the interactive operation elements can be stored on a memory device. In preferred embodiments each information artifact and its associated provenance representation are stored in snippets. A snippet can be represented in one of a variety of formats, such as XML. In an XML representation, referring to FIG. 2, the snippet contains three top-level elements: the header, which contains summary metadata about the snippet; the view, which is the content that the user intended to capture (such as a selection of text or an image from a visualization tool); and the provenance, which is the aforementioned sequence of interaction steps resulting in that view. The memory device can store a plurality of snippets contributed by one or more analysts 108, 109, 110. In such instances, the memory device can include a communications interface that provides access to the plurality of analysts. Furthermore, the snippets can be shared among the analysts. For example, one analyst can contribute snippets to a shared memory device and another analyst can view, edit, and/or utilize the snippets when generating a report 115. In one embodiment an analyst can subscribe to another analyst's snippet feed.

A report 115 can comprise one or more snippets. The snippets can be attached, embedded, or referenced in the report, thereby making the reports auditable because a reader of the report can view the provenance steps embedded in a snippet, thereby understanding the process the analyst took in performing the analysis that went into the report. In preferred embodiments, the snippets arranged in a report maintain references to the memory device such that the report is dynamic. Passages in the text of a report can be selected by the analyst and an assertion made between the passage and a snippet that the analyst has previously collected. The assertion creates a reference between the passage and the snippet or snippets from which the passage is derived, and these references may further be typed to indicate the nature of the relationship between the snippet and passage (such as the snippet serving as "supporting evidence" for the passage). The reference contains among other metadata the unique identifier for the snippet and the timestamp at which the reference was asserted. Each time a user loads a report that contains passages with references to snippets, the system may check to determine if these snippets have changed since the last time the user viewed the document. If the timestamp on a snippet is newer than that reflected in the reference to that snippet contained within the report, the system may indicate to the user that there may be new information available in that snippet, and the user can be prompted to load the new snippet. In this manner, it is possible to automatically notify users that content in a report they are viewing may be out of date.

Dynamic reports can be changed automatically as changes occur to the information artifact (the content of a snippet) and/or the provenance representation. For example, if an analyst's findings were to change based on newly collected information after a report has already been created, then the report can be updated in near-real-time as the analyst updates the original snippet. Consumers of the report would see the updates because the report viewer will identify cases where update snippets are available.

In another embodiment, reports can be made interactive by embedding live analysis "widgets" in the document. These widgets can consist of any content that is web-accessible. For instance, if the "view" component of a snippet is an image, that image can be rendered in the report. In a more complex case, the "view" component of a snippet can be a web-based interactive component such as an information visualization. Embedding the "view" of a snippet in a report allows the consumer of a report to see what the analyst saw, and if that view is interactive (for instance, by including Javascript or Flash content), then the code that creates the view can be included in the markup of the snippet's view element and rendered for the consumer. The consumer can then interact with the web-based interactive component in the same state as it existed for the analyst that captured it in a snippet, supporting transfer of knowledge between analyst and consumer. By accessing the provenance information in a snippet, consumers of the report can review the analyst's provenance trail thereby understanding the series of steps the analyst followed to identify a particular snippet. When snippets represent particularly high value pieces of information in a report, the ability to review the provenance that underlies them enables auditing and evaluation of the report.

Provenance does not necessarily end after a snippet is arranged in a report. For example, an analyst can further identify other instances of reports that contain a given snippet, allowing the analyst to detect redundant reporting. Also, if the snippet changes, or an analyst wants to retract a snippet, the system can find any instance of a report that contains that snippet and either a) notify the reader that the content has been changed or retracted or b) automatically retract the relevant snippet content.

Figure 3:
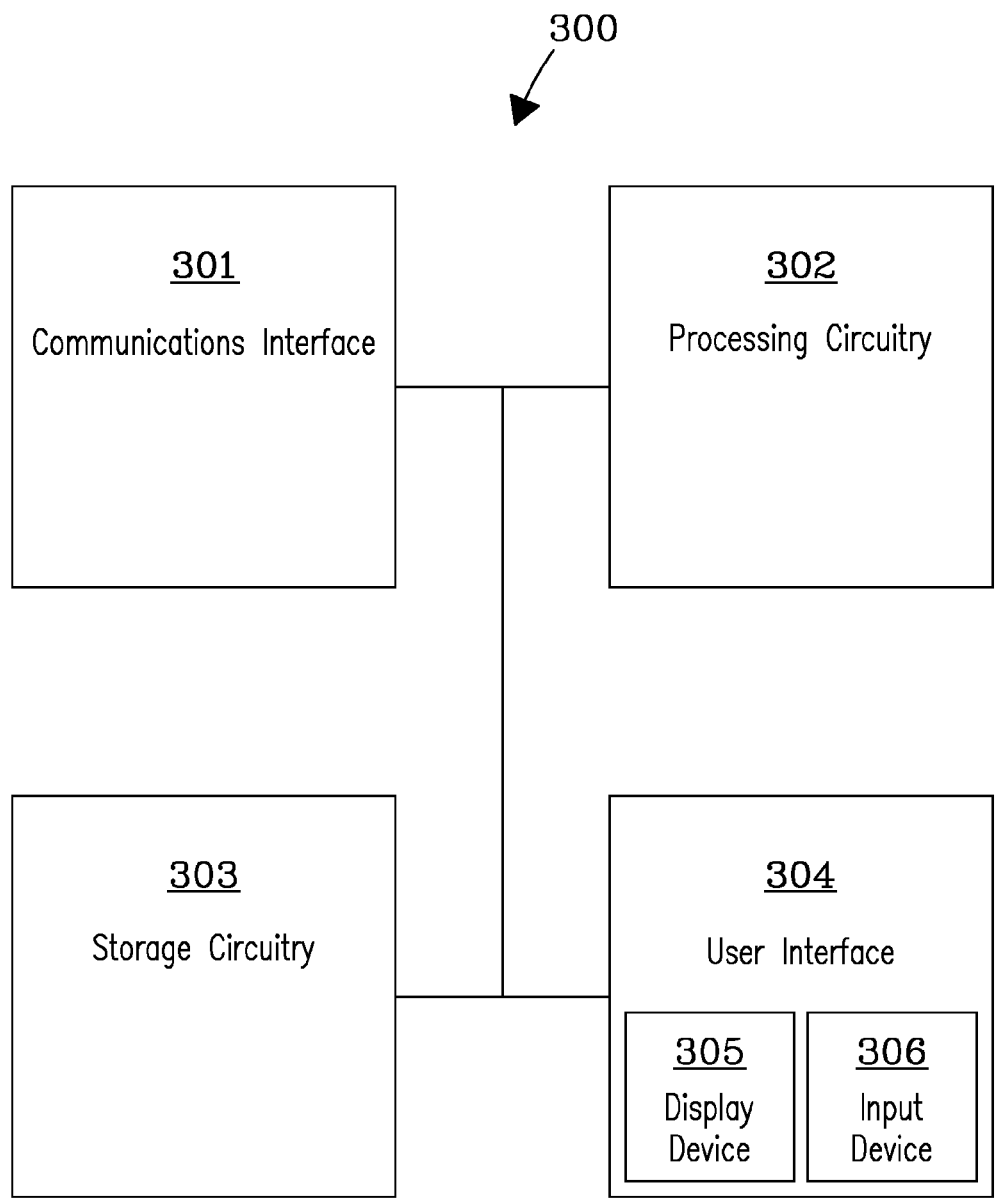
FIG. 3 is an illustration depicting a system for storing and managing information artifacts according to embodiments of the present invention.

Referring to FIG. 3, an exemplary system 300 for storing and managing information artifacts collected electronically by information analysts is illustrated. In the depicted embodiment, the system is implemented as a computing device such as a work station, server, handheld computing device, or personal computer, and can include a communications interface 301, processing circuitry 302, storage circuitry 303, and, in some instances, a user interface 304. Other embodiments of system 300 can include more, less, and/or alternative components.

The communications interface 301 is arranged to implement communications of system 300 with respect to a network, the internet, an external device, a remote data store, etc. Communications interface 301 can be implemented as a network interface card, serial connection, parallel connection, USB port, SCSI host bus adapter, Firewire interface, flash memory interface, floppy disk drive, wireless networking interface, PC card interface, PCI interface, IDE interface, SATA interface, or any other suitable arrangement for communicating with respect to system 300. Accordingly, communications interface 301 can be arranged, for example, to communicate information bi-directionally with respect to system 300.

In an exemplary embodiment, communications interface 301 can interconnect system 300 to one or more persistent data stores having information including, but not limited to, mappings, sets of data to be analyzed, information analysis software applications, information artifacts, interactive operation elements, and reports stored thereon. The communications interface can also interconnect a plurality of information analysts. The data store can be locally attached to system 300 or it can be remotely attached via a wireless and/or wired connection through communications interface 301. For example, the communications interface 301 can facilitate access, storage, and retrieval of information artifacts, operation elements, and/or reports from one or more data stores containing processor-usable information. The communications interface can also facilitate transmission of data between a plurality of analysts.

In another embodiment, processing circuitry 302 is arranged to execute computer-readable instructions, process data, control data access and storage, issue commands, perform calculations, and control other desired operations. Processing circuitry 302 can operate to map specific, available interactive affordances of a plurality of software applications to interactive operation elements in a computer-readable form. The processing circuitry 302 can further operate to capture the sequence of interactive operation elements that are performed by the information analyst and store a snippet on a memory device. In some embodiments, the processing circuitry can further operate to arrange a plurality of snippets into a report.

Processing circuitry can comprise circuitry configured to implement desired programming provided by appropriate media in at least one embodiment. For example, the processing circuitry 302 can be implemented as one or more of a processor, and/or other structure, configured to execute computer-executable instructions including, but not limited to software, middleware, and/or firmware instructions, and/or hardware circuitry. Exemplary embodiments of processing circuitry 302 can include hardware logic, PGA, FPGA, ASIC, state machines, an/or other structures alone or in combination with a processor. The examples of processing circuitry described herein are for illustration and other configurations are both possible and appropriate.

Storage circuitry 303 can be configured to store programming such as executable code or instructions (e.g., software, middleware, and/or firmware), electronic data (e.g., electronic files, databases, data items, etc.), and/or other digital information and can include, but is not limited to, processor-usable media. Exemplary programming can include, but is not limited to programming configured to cause system 300 to store and manage information artifacts, as described elsewhere herein. Processor-usable media can include, but is not limited to, any computer program product, data store, or article of manufacture that can contain, store, or maintain programming, data, and/or digital information for use by, or in connection with, an instruction execution system including the processing circuitry 302 in the exemplary embodiments described herein. Generally, exemplary processor-usable media can refer to electronic, magnetic, optical, electromagnetic, infrared, or semiconductor media. More specifically, examples of processor-usable media can include, but are not limited to floppy diskettes, zip disks, hard drives, random access memory, compact discs, and digital versatile discs.

At least some embodiments or aspects described herein can be implemented using programming configured to control appropriate processing circuitry and stored within appropriate storage circuitry and/or communicated via a network or via other transmission media.

User interface 304 can be configured to interact with a user and/or information analyst, including conveying information to the user (e.g., displaying data for observation by the analyst, audibly communicating data to the user, presenting reports and information artifacts, etc.) and/or receiving inputs from the user (e.g., tactile inputs, voice instructions, etc.). Accordingly, in one exemplary embodiment, the user interface 304 can include a display device 305 configured to depict visual information, and a keyboard, mouse and/or other input device 306. Examples of a display device include cathode ray tubes, plasma displays, and LCDs.

The embodiment shown in FIG. 3 can be an integrated unit configured for storing and managing information artifacts. Other configurations are possible, wherein system 300 is configured as a networked server and one or more clients are configured to access the processing circuitry and/or storage circuitry for accessing information to be analyzed as well as information artifacts and reports including the aspects described elsewhere herein, required to store and manage the information artifacts.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer-implemented process for storing and managing information artifacts collected using a computing device by information analysts, the process characterized by:
   Mapping specific, available interactive affordances of a plurality of software applications to interactive operation elements in a computer-readable form;
   Capturing the sequence of interactive operation elements that are performed by the information analyst, who is collecting an information artifact from at least one of the plurality of software applications; and
   Storing the information artifact together with the interactive operation elements as a snippet on a memory device, which is operably connected to the processor, wherein the snippet comprises a view from the software application, data contained in the view, and the sequence of interactive operation elements stored as a provenance representation comprising operation element class, timestamp, and data object attributes for each interactive operation element in the sequence.

2. The computer-implemented process of claim 1, further comprising arranging a plurality of snippets into a report.

3. The computer-implemented process of claim 2, further comprising creating a reference between snippets arranged in the report and snippets stored on the memory device.

4. The computer-implemented process of claim 1, wherein the memory device comprises a centralized repository having a communications interface providing access for a plurality of information analysts.

5. The computer-implemented process of claim 4, wherein the communications interface is configured to serve snippet feeds to subscribed information analysts.

6. The computer-implemented process of claim 4, wherein said capturing comprises capturing snippets from the plurality of information analysts and providing snippets from a first information analyst to a second information analyst.

7. A system for storing and managing information artifacts collected electronically by information analysts, the system characterized by a processor programmed to:
- Map specific, available interactive affordances of a plurality of software applications to interactive operation elements in a computer-readable form;
- Capture the sequence of interactive operation elements that are performed by the information analyst, who is collecting an information artifact from at least one of the plurality of software applications; and
- Store the information artifact together with the interactive operation elements as a snippet on a memory device, which is operably connected to the processor, wherein the snippet comprises a view from the software application, data contained in the view, and the sequence of interactive operation elements stored as a provenance representation comprising operation element class, timestamp, and data object attributes for each interactive operation element in the sequence.

8. The system of claim 7, wherein the processor is further programmed to arrange a plurality of snippets into a report.

9. The system of claim 8, wherein the processor is further programmed to create a reference between snippets arranged in the report and snippets stored on the memory device.

10. The system of claim 7, wherein the memory device comprises a centralized repository having a communications interface providing access for a plurality of information analysts.

11. The system of claim 10, wherein the communications interface is configured to serve snippet feeds to subscribed information analysts.

12. The system of claim 10, wherein programming to capture the sequence of interactive operation elements comprises programming to capture snippets from the plurality of information analysts and to provide snippets from a first information analyst to a second information analyst.

* * * * *